(12) United States Patent
Zhu (10) Patent No.: US 9,055,297 B2
(45) Date of Patent: *Jun. 9, 2015

(54) SYSTEM, METHOD, AND APPARATUS FOR DISPLAYING PICTURES

(71) Applicant: Broadcom Corporation, Irvine, CA (US)

(72) Inventor: Qin-Fan Zhu, Acton, MA (US)

(73) Assignee: BROADCOM CORPORATION, Irvine, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/780,354

(22) Filed: Feb. 28, 2013

(65) Prior Publication Data

US 2013/0176381 A1 Jul. 11, 2013

Related U.S. Application Data

(63) Continuation of application No. 12/695,270, filed on Jan. 28, 2010, now Pat. No. 8,411,760, which is a continuation of application No. 11/001,208, filed on Nov. 30, 2004, now Pat. No. 7,675,872.

(51) Int. Cl.
| | |
|---|---|
| H04N 7/26 | (2006.01) |
| H04N 19/44 | (2014.01) |
| H04L 29/06 | (2006.01) |
| H04N 7/15 | (2006.01) |
| H04N 21/434 | (2011.01) |
| H04N 21/44 | (2011.01) |
| H04N 21/462 | (2011.01) |

(52) U.S. Cl.
CPC .......... *H04N 19/44* (2013.01); *H04L 29/06027* (2013.01); *H04N 7/15* (2013.01); *H04N 21/434* (2013.01); *H04N 21/44004* (2013.01); *H04N 21/4622* (2013.01); *H04L 65/604* (2013.01); *H04L 65/607* (2013.01); *H04L 65/4046* (2013.01)

(58) Field of Classification Search
CPC ............ H04N 19/00533; H04N 19/44; H04N 21/434; H04N 21/44004; H04N 21/4622; H04N 7/15; H04L 65/4056; H04L 65/607; H04L 65/604; H04L 29/06027
USPC ......... 348/14.07, 14.08, 14.09; 370/235, 259, 370/260, 349, 473; 375/240.26, 240.27, 375/240.25; 380/210; 709/217
See application file for complete search history.

(56) References Cited

U.S. PATENT DOCUMENTS

| | | |
|---|---|---|
| 5,287,178 A | 2/1994 | Acampora et al. |
| 5,453,780 A | 9/1995 | Chen et al. |
| 5,481,543 A | 1/1996 | Veltman |
| 5,621,840 A | 4/1997 | Kawamura et al. |
| 5,666,487 A | 9/1997 | Goodman et al. |
| 5,692,020 A | 11/1997 | Robbins |
| 5,703,877 A | 12/1997 | Nuber et al. |

(Continued)

*Primary Examiner* — Gerald Gauthier
(74) *Attorney, Agent, or Firm* — Foley & Lardner LLP (57) ABSTRACT

Presented herein are systems, methods, and apparatus for displaying pictures. In one embodiment, there is presented a decoder system for decoding video data. The decoder system comprises a port and a transport processor. The port receives packets carrying encoded video data from a plurality of video streams. The transport processor changes a header to encoded video data from at least one of the packets. The header identifies a particular one of the plurality of video streams, wherein the at least one packet is from the particular one of the plurality of video stream.

20 Claims, 8 Drawing Sheets

(56) References Cited

U.S. PATENT DOCUMENTS

| | | | |
|---|---|---|---|
| 5,910,960 A | 6/1999 | Claydon et al. | |
| 6,057,889 A | 5/2000 | Reitmeier et al. | |
| 6,154,771 A * | 11/2000 | Rangan et al. | 709/217 |
| 6,208,643 B1 | 3/2001 | Dieterich et al. | |
| 6,246,720 B1 * | 6/2001 | Kutner et al. | 375/240.25 |
| 6,285,661 B1 | 9/2001 | Zhu et al. | |
| 6,327,253 B1 | 12/2001 | Frink | |
| 6,392,672 B1 | 5/2002 | Kulik | |
| 6,459,736 B1 | 10/2002 | Ohta et al. | |
| 6,614,442 B1 | 9/2003 | Ouyang et al. | |
| 6,647,152 B2 | 11/2003 | Willis et al. | |
| 6,738,356 B1 | 5/2004 | Russell et al. | |
| 6,750,918 B2 | 6/2004 | Aneja et al. | |
| 6,823,016 B1 * | 11/2004 | Nguyen et al. | 375/240.25 |
| 6,959,090 B1 | 10/2005 | Alve et al. | |
| 6,963,353 B1 | 11/2005 | Firestone | |
| 6,987,739 B2 | 1/2006 | Kitazawa et al. | |
| 7,050,481 B1 | 5/2006 | Hulbert | |
| 7,176,957 B2 | 2/2007 | Ivashin et al. | |
| 7,177,522 B2 | 2/2007 | MacInnis | |
| 7,245,316 B2 | 7/2007 | Grimes et al. | |
| 7,292,690 B2 | 11/2007 | Candelore et al. | |
| 7,292,692 B2 | 11/2007 | Bonan et al. | |
| 7,298,966 B2 | 11/2007 | Nakatani et al. | |
| 7,315,898 B2 | 1/2008 | Kohno | |
| 7,327,791 B1 | 2/2008 | Sekiguchi et al. | |
| 7,336,682 B2 | 2/2008 | Singh | |
| 7,366,241 B2 | 4/2008 | Matsui | |
| 7,412,152 B2 | 8/2008 | Yahata et al. | |
| 7,460,599 B2 | 12/2008 | Kono et al. | |
| 7,471,298 B1 | 12/2008 | Noonburg | |
| 7,492,387 B2 | 2/2009 | Yang et al. | |
| 7,499,075 B2 | 3/2009 | Miceli | |
| 7,508,874 B2 * | 3/2009 | Demas et al. | 375/240.27 |
| 7,554,612 B2 | 6/2009 | Chidambaram et al. | |
| 7,609,709 B2 | 10/2009 | Kim et al. | |
| 7,616,591 B2 | 11/2009 | Yang | |
| 7,630,442 B2 | 12/2009 | Sekiguchi et al. | |
| 7,675,872 B2 * | 3/2010 | Zhu | 370/260 |
| 7,692,683 B2 | 4/2010 | Kenoyer et al. | |
| 7,805,399 B2 | 9/2010 | Pinder et al. | |
| 7,835,403 B2 * | 11/2010 | Kato | 370/503 |
| 7,889,206 B2 | 2/2011 | Pai et al. | |
| 7,974,200 B2 | 7/2011 | Walker et al. | |
| 7,978,761 B2 | 7/2011 | Rachwalski et al. | |
| 8,018,902 B2 | 9/2011 | Wintzell | |
| 8,089,948 B2 | 1/2012 | Garudadri et al. | |
| 8,125,932 B2 | 2/2012 | Yang | |
| 8,135,852 B2 | 3/2012 | Nilsson et al. | |
| 8,265,277 B2 | 9/2012 | Bonan et al. | |
| 8,411,760 B2 * | 4/2013 | Zhu | 375/240.26 |
| 8,837,599 B2 * | 9/2014 | Aggarwal et al. | 375/240.25 |
| 2003/0056224 A1 | 3/2003 | Stone | |
| 2003/0142752 A1 * | 7/2003 | Demas et al. | 375/240.27 |
| 2003/0142878 A1 | 7/2003 | Willis et al. | |
| 2003/0212994 A1 | 11/2003 | Fitzsimmons et al. | |
| 2004/0008784 A1 | 1/2004 | Kikuchi et al. | |
| 2004/0148501 A1 | 7/2004 | Livaditis et al. | |
| 2004/0240546 A1 | 12/2004 | Wells | |
| 2004/0264940 A1 | 12/2004 | Hulmani et al. | |
| 2005/0117654 A1 | 6/2005 | Im | |
| 2005/0175098 A1 | 8/2005 | Mandayam et al. | |
| 2006/0013568 A1 | 1/2006 | Rodriguez | |
| 2006/0034301 A1 | 2/2006 | Anderson et al. | |
| 2006/0072671 A1 | 4/2006 | Aggarwal et al. | |
| 2006/0109914 A1 | 5/2006 | Pandit et al. | |
| 2006/0114844 A1 * | 6/2006 | Zhu | 370/260 |
| 2006/0193382 A1 | 8/2006 | Haskell et al. | |
| 2007/0041452 A1 | 2/2007 | Kondo et al. | |
| 2007/0110166 A1 | 5/2007 | Amino | |
| 2007/0110391 A1 | 5/2007 | MacInnis | |
| 2007/0140647 A1 | 6/2007 | Kusunoki et al. | |
| 2007/0291940 A1 | 12/2007 | Candelore et al. | |
| 2007/0291942 A1 | 12/2007 | Candelore et al. | |
| 2008/0138048 A1 | 6/2008 | Kim et al. | |
| 2009/0087169 A1 | 4/2009 | Nakanishi et al. | |
| 2010/0118980 A1 * | 5/2010 | Zhu | 375/240.26 |
| 2011/0055322 A1 | 3/2011 | Gregersen | |
| 2013/0176381 A1 * | 7/2013 | Zhu | 348/14.08 |

\* cited by examiner

```
          + - + - + - + - + - + - + - + - +
Byte 0 :  | 0 | 0 | 0 | 0 | 0 | 0 | 0 | 0 |
          + - + - + - + - + - + - + - + - +
Byte 1 :  | 0 | 0 | 0 | 0 | 0 | 0 | 0 | 0 |
          + - + - + - + - + - + - + - + - +
Byte 2 :  | 0 | 0 | 0 | 0 | 0 | 0 | 0 | 1 |
          + - + - + - + - + - + - + - + - +
Byte 3 :  |             stream_id           |
          + - + - + - + - + - + - + - + - +
Byte 4 :  |                                 |
          |            Packet               |
Byte 5 :  |            Length               |
          + - + - + - + - + - + - + - + - +
Byte 6 :  | M |   L   |        s_type       |
          + - + - + - + - + - + - + - + - +
Byte 7 :  |                                 |
Byte 8 :  |                                 |
          |           time_stamp            |
Byte 9 :  |                                 |
Byte 10 : |                                 |
          + - + - + - + - + - + - + - + - +
          |          header_data            |
          + - + - + - + - + - + - + - + - +
          |          video_data             |
          + - + - + - + - + - + - + - + - +
          | 0 | 0 | 0 | 0 | 0 | 0 | 0 | 0 |
          + - + - + - + - + - + - + - + - +
          | 0 | 0 | 0 | 0 | 0 | 0 | 0 | 0 |
          + - + - + - + - + - + - + - + - +
          | 0 | 0 | 0 | 0 | 0 | 0 | 0 | 1 |
          + - + - + - + - + - + - + - + - +
```

FIG. 4

| D0 | 1 | 0 | 0 | P0 |
| D1 | 1 | 0 | 0 | P1 |
| D2 | 1 | 0 | 0 | P2 |
| D3 | 1 | 0 | 0 | P3 |
| D4 | 1 | 0 | 0 | E |
| D5 | 1 | 0 | 0 | P |
| D6 | 1 | 0 | 0 | F |
| D7 | 1 | 0 | 0 | 1 |

SYSTEM, METHOD, AND APPARATUS FOR DISPLAYING PICTURES

RELATED APPLICATIONS

This application is a continuation of U.S. application Ser. No. 12/695,270 for "System, Method, And Apparatus For Displaying Pictures", filed Jan. 28, 2010, which is a continuation of U.S. application Ser. No. 11/001,208 for "System, Method, And Apparatus For Displaying Pictures", filed Nov. 30, 2004, and issued as U.S. Pat. No. 7,675,872, all of which are incorporated herein by reference in their entirety, for all purposes.

FEDERALLY SPONSORED RESEARCH OR DEVELOPMENT

[Not Applicable]

MICROFICHE/COPYRIGHT REFERENCE

[Not Applicable]

BACKGROUND

Video conferencing involves videos that are captured from multiple places. The video streams are then displayed on single displays. The video streams are usually transmitted to a video combiner at the display end over a communication network. The communication network can include, for example, the internet, a local area network, or wide area network.

Due to bandwidth considerations, the video is usually encoded as a video stream in accordance with a video compression standard, such as H.261, H.263, or H.264. The video streams are then packetized for transmission over a communication network.

The video combiner usually receives the video streams in a mixed order. To separate the video streams, the video combiner usually includes separate ports for each different video stream. The video combiner decodes the video stream and combines the pictures of the video stream for display onto a display device.

To keep the video streams separate, the video combiner includes separate video decoders for each video stream, for decoding the video stream. The decoded video streams are provided to a combiner over other multiple ports. As the number of video streams increases, the number of ports and video decoders also increases, thereby increasing costs.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY

Presented herein are systems, methods, and apparatus for displaying pictures.

In one embodiment, there is presented a decoder system for decoding video data. The decoder system comprises a port and a transport processor. The port receives packets carrying encoded video data from a plurality of video streams. The transport processor adds an indicator to encoded video data from at least one of the packets. The indicator identifies a particular one of the plurality of video streams, where the at least one packet is from the particular one of the plurality of video streams.

In another embodiment, there is presented a decoder system for providing a plurality of decoded video streams. The decoder system comprises a video decoder and an output processor. The video decoder decodes pictures from a plurality of encoded video streams. The output processor adds at least one indicator to at least one picture. The at least one indicator identifies at least one particular video stream, wherein the at least one picture is from the at least one particular video stream.

In another embodiment, there is presented a method for decoding video data. The method comprises receiving packets carrying encoded video data from a plurality of video streams; and adding an indicator to encoded video data from at least one of the packets. The indicator identifies a particular one of the plurality of video streams, and the at least one packet is from the particular one of the plurality of video streams.

In another embodiment, there is presented a video conference processor for providing displaying a plurality of video streams. The video conference processor comprises a plurality of display queues and a picture demultiplexer. The display queues correspond to the plurality of video streams. The picture demultiplexer determines a particular video stream for a picture, where the picture is from the particular video stream, and writes the picture to a particular one of the display queues corresponding to the particular video stream.

These and other advantages and novel features of the present invention, as well as details of an illustrated embodiment thereof, will be more fully understood from the following description and drawings.

DETAILED DESCRIPTION

Figure 1:
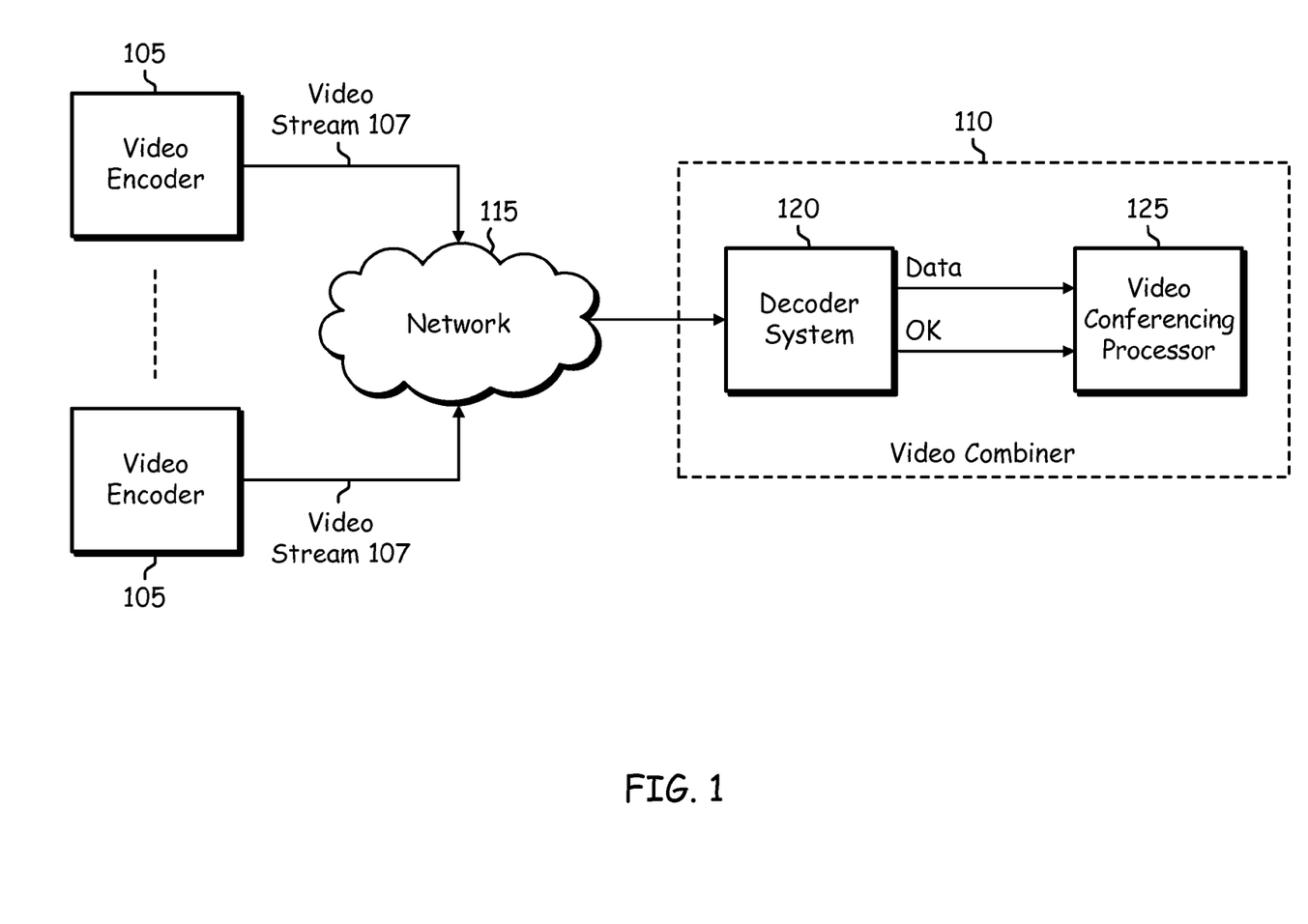
FIG. 1 is a block diagram of an exemplary video conferencing system in accordance with an embodiment of the present invention.

Referring now to FIG. 1, there is illustrated a block diagram describing a video teleconferencing system in accordance with an embodiment of the present invention. The video teleconferencing system comprises a plurality of video encoders 105 for capturing, and encoding a corresponding plurality of video streams 107. The video encoders 105 can be placed at the different locations where the participants to the video teleconference are located.

The video encoders 105 provide the encoded video streams 107 to a video conference combiner 110 via a network 115. The video conference combiner 110 receives the video streams 107 and creates a video conference display stream. The video conference display stream combines the video streams 107.

The video conference combiner 110 comprises a decoder system 120 and a video conferencing processor 125. The decoder system 120 decodes each of the encoded video streams 107. The video conference processor 125 combines the decoded video streams.

The video encoders 105 provide the encoded video streams in series of what are known as transport packets. A transport packet includes a header and a portion of the video stream 107.

Figure 2:
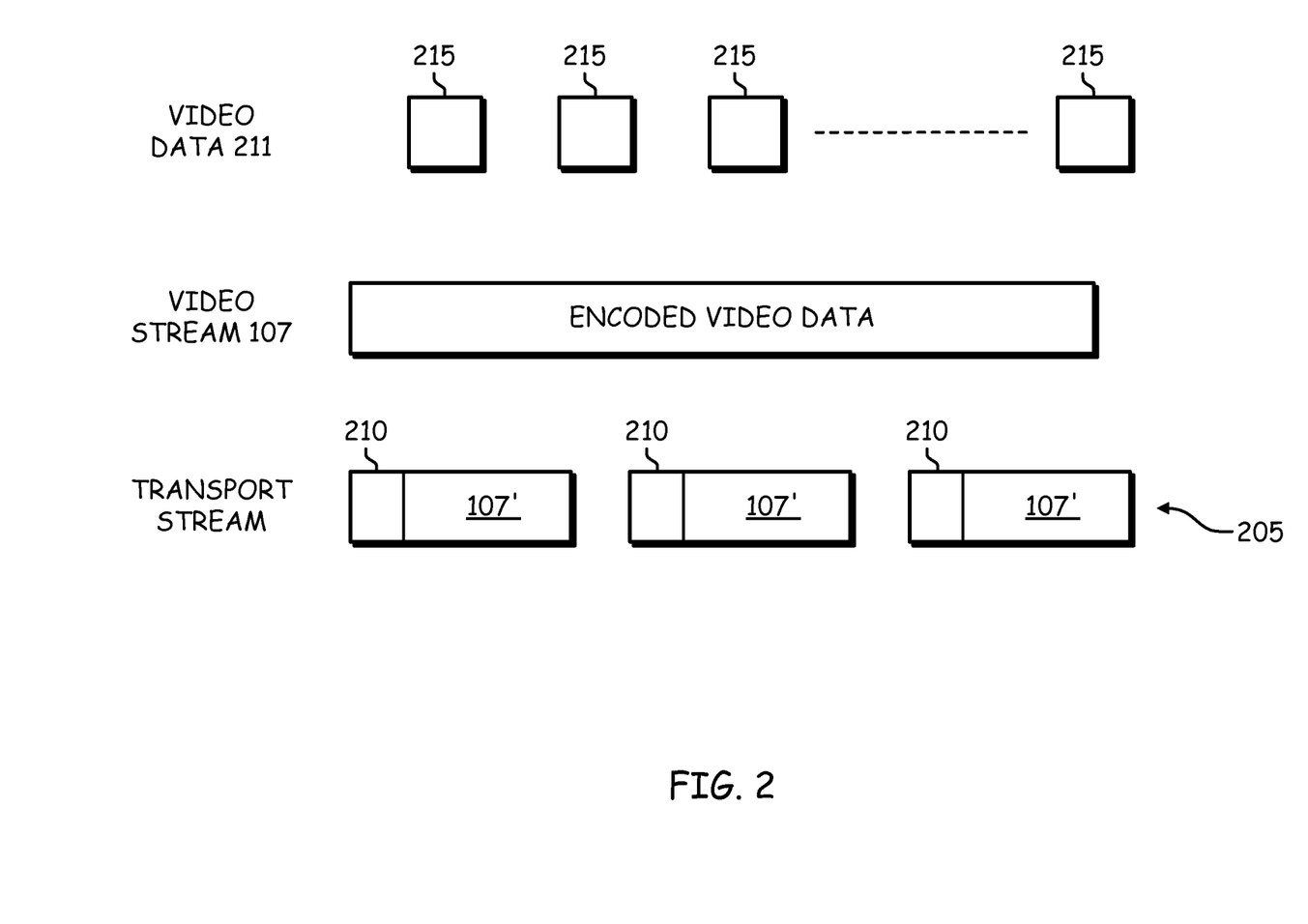
FIG. 2 is a block diagram describing a transport stream.

Referring now to FIG. 2, there is illustrated a block diagram describing a video stream 107 carried in a series of transport packets 205. Video data 211 comprises a series of pictures 215. The video stream 107 represents encoded video data. The video data 211 can be encoded by compressing the video data in accordance with a variety of compressions standards, such as, but not limited to, H.261, H.263, H.264, VC-9, to name a few.

The video stream 107 is broken into encoded video data portions 107'. Each portion of the video stream 107 forms the payload of what is known as a transport packet 205. The transport packet 205 also includes a header 210. The header 210 includes certain information relating to the transmission of the transport packet 205. The information can include, for example, a network address associated with the video encoder 105, such as, but not limited to, an IP address or an ISDN number.

Figure 3:
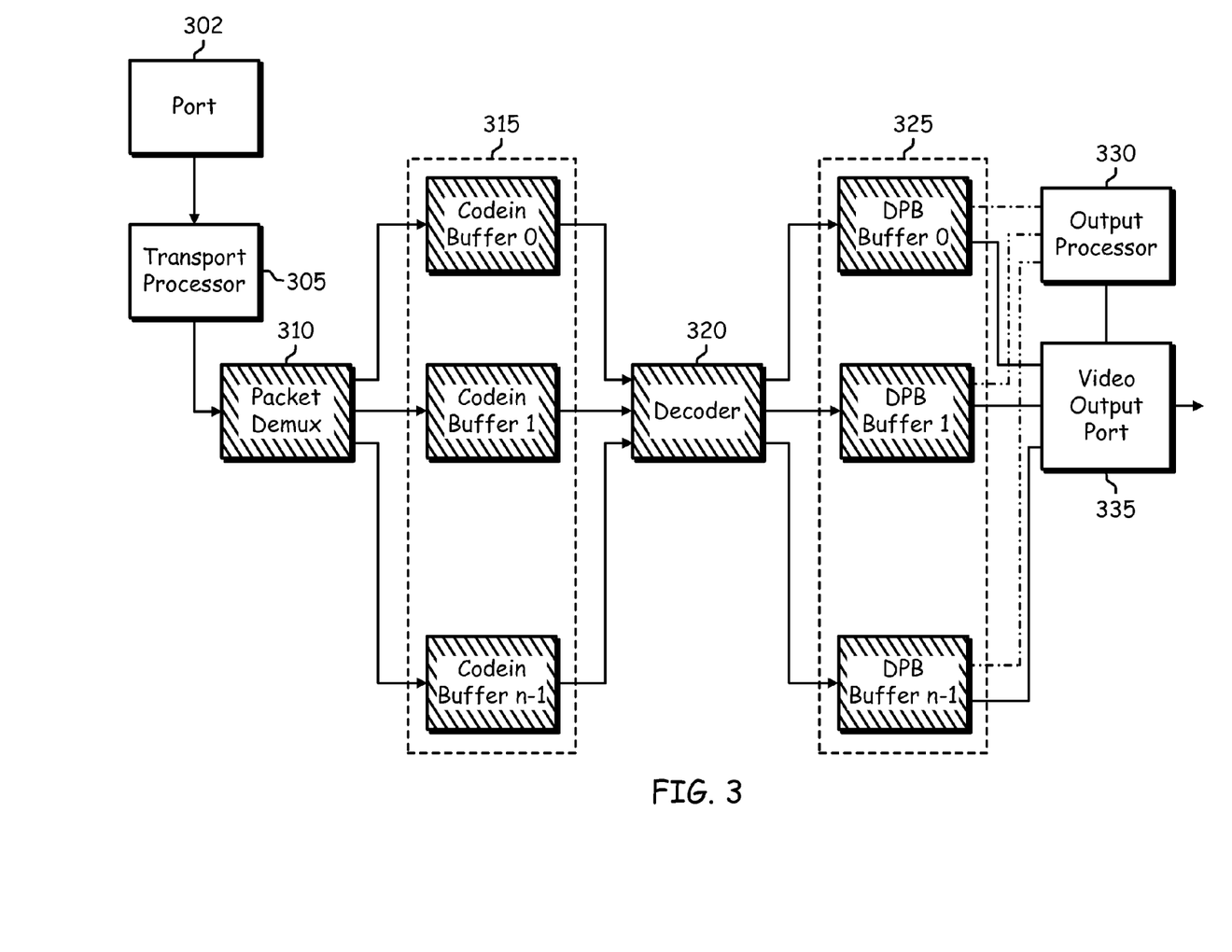
FIG. 3 is a block diagram describing a multistream video decoder in accordance with an embodiment of the present invention.

Referring now to FIG. 3, there is illustrated a block diagram describing an exemplary decoder system 300 in accordance with an embodiment of the present invention. The decoder system comprises a port 302, a transport processor 305, a packet demultiplexer 310, a first plurality of buffers 315, a video decoder 320, a second plurality of buffers 325, a output processor 330, and a video output port 335.

The port 302 receives the transport packets carrying encoded video data from a plurality of video streams. The transport processor 305 processes and removes the transport headers 210 and can determine which video stream 107 the packet 205 is from by examining the address in the transport header 210. The transport processor 305 then adds another header to the encoded video data portion 107' carried by the transport packet 205. The header identifies the video stream 107 to which the packet is from, in addition to other information described below.

The first plurality of buffers 315 corresponds to the plurality of video streams 107. The demultiplexer 310 writes the encoded video data 107' to the particular buffer from the first plurality of buffers 315 that corresponds to the video streams 105 from which the encoded video data 107' is from.

A video decoder 320 decodes the encoded video data stored in the first plurality of buffers 315. The decoding can include decompressing the encoded video data. The video decoder 320 can determine which encoded video data to decode by the state of the first plurality of buffers 315. For example, the video decoder 320 can decode the encoded video data from the buffer 315 storing the most video data.

The second plurality of buffers 325 corresponds to the plurality of video streams. The video decoder 320 writes the decoded video data to the second plurality of buffers 325. As the video decoder 320 decodes the encoded video data, pictures 215 from video data 211 are generated.

The output processor 330 adds headers to the decoded pictures 215. The headers indicate the video streams 107 that encoded the pictures 215, and accordingly, the particular video encoder 105 from which the picture 215 was captured. The video output port 335 transmits the pictures to the video conferencing processor 125.

Figure 4:
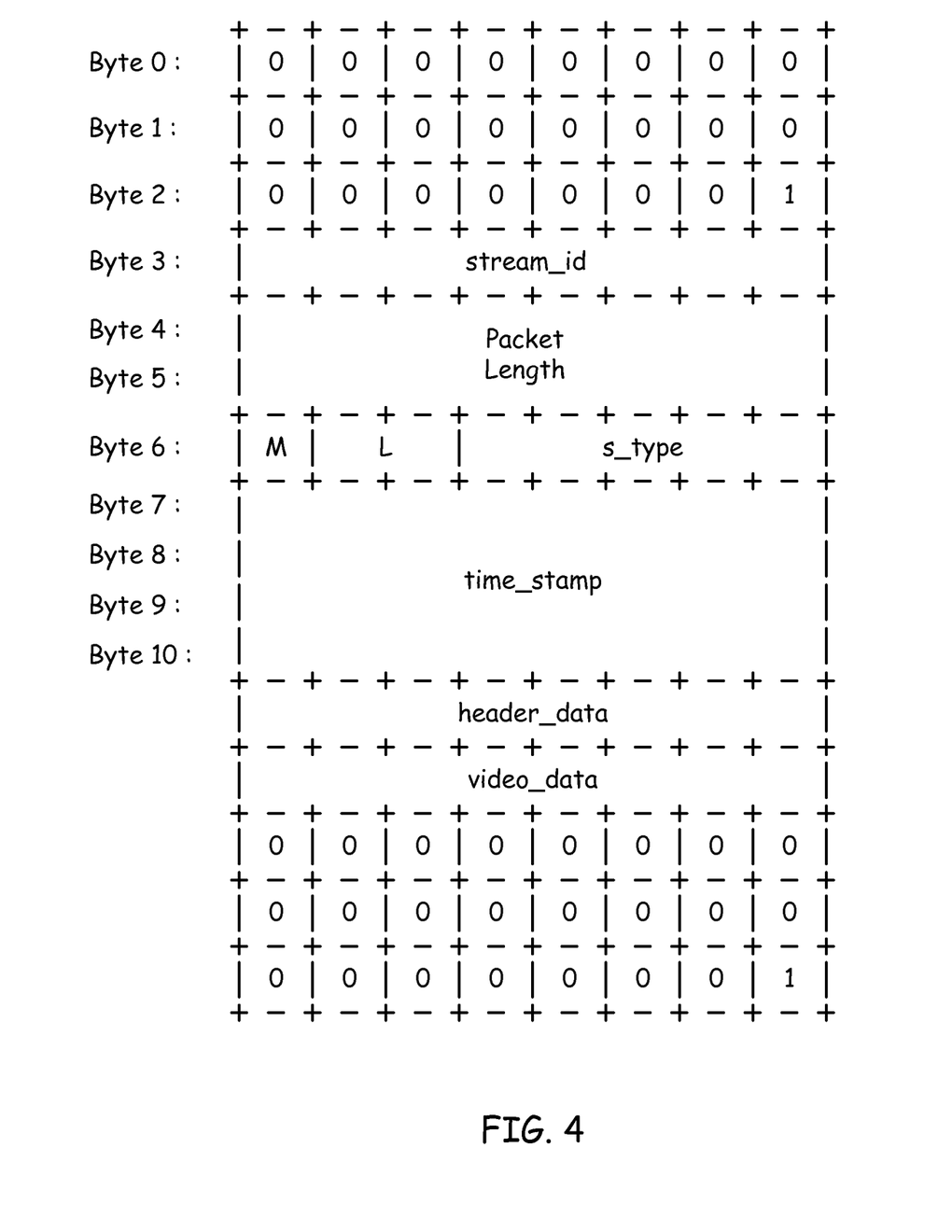
FIG. 4 is a block diagram describing the formatting of the compressed video data in accordance with an embodiment of the present invention.

Referring now to FIG. 4, there is illustrated an exemplary header added by the transport processor 305 in accordance with an embodiment of the present invention. The 3-byte pattern start code (00 00 01) serves as the packet delimiter. The three-byte packet end delimiter can also serve as the starting of the next packet. The field, stream_id is 8 bits and identifies the stream which the packet belongs to. In an exemplary case, the range of stream_id shall be between 224 and 232. The field Packet Length has 16 bits, and signals the packet payload length counting from the field s_type. The start code is excluded from this counting.

The field M, is the marker bit, which signals that the current packet is the end of a picture. The field L is 2 bits, and is used for error recovery and is defined as follows:
0: normal packet with previous packet undamaged
1: one or more packets are lost before the current packet
2: the current packet is damaged.

The field s_type is 5 bits and identifies the stream type and is defined as following:
1: H.261
2: MPEG2/H.262
3: H.263
4: H.264

The field time_stamp is 32 bits and contains 4 bytes for presentation time stamps. This field is used for audio-video synchronization. This value will be passed along with the corresponding decoded video frame for presentation. The field header_data is variable length and is used for error recovery. The field video_data is variable length.

Data between two start codes can be contained in an individual packet. In the last byte of the video_data, all unused bits can be filled with 0's.

An H.261 header can be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| SBIT| EBIT|I|V| GOBN|   MBAP  | QUANT|   HMVD|   VMVD |
+-+-+-+-+-+-+-+-+-+-+-+-+-+-+-+-+-+-+-+-+-+-+-+-+-+-+-+-+-+-+-+-+
```

The fields in the H.261 header have the following meaning:
Start Bit Position (SBIT): 3 Bits
  Number of most significant bits that are ignored in the first data octet.
End Bit Position (EBIT): 3 Bits
  Number of least significant bits that are ignored in the last data octet.
INTRA-Frame Encoded Data (I): 1 Bit
  Set to 1 if this packet contains only INTRA-frame coded blocks.
  Set to 0 if this packet may or may not contain INTRA-frame coded blocks.
Motion Vector Flag (V): 1 Bit
  Set to 0 if motion vectors are not used in this packet.
  Set to 1 if motion vectors may or may not be used in this packet.

GOB Number (GOBN): 4 Bits

Encodes the GOB number in effect at the start of the packet. Set to 0 if the packet begins with a GOB header.

Macroblock Address Predictor (MBAP): 5 Bits

Encodes the macroblock address predictor (i.e. the last MBA encoded in the previous packet). This predictor ranges from 0-32 (to predict the valid MBAs 1-33), but because the bit stream cannot be fragmented between a GOB header and MB 1, the predictor at the start of the packet can never be 0. Therefore, the range is 1-32, which is biased by −1 to fit in 5 bits. For example, if MBAP is 0, the value of the MBA predictor is 1. Set to 0 if the packet begins with a GOB header.

Quantizer (QUANT): 5 Bits

Quantizer value (MQUANT or GQUANT) in effect prior to the start of this packet.

Horizontal Motion Vector Data (HMVD): 5 Bits

Reference horizontal motion vector data (MVD). Set to 0 if V flag is 0 or if the packet begins with a GOB header, or when the MTYPE of the last MB encoded in the previous packet was not MC. HMVD is encoded as a 2's complement number, and '10000' corresponding to the value −16 is forbidden (motion vector fields range from +/−15).

Vertical Motion Vector Data (VMVD): 5 Bits

Reference vertical motion vector data (MVD). Set to 0 if V flag is 0 or if the packet begins with a GOB header, or when the MTYPE of the last MB encoded in the previous packet was not MC. VMVD is encoded as a 2's complement number, and '10000' corresponding to the value −16 is forbidden (motion vector fields range from +/−15).

H.263 Header

There are 2 types of headers for H.263: Mode A and Mode B. The start of Mode A packet is aligned with Picture or GOB start.

H.263 Mode A Header Format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|F|P|SBIT| EBIT| SRC |I|     R                                 |
+-+-+-+-+-+-+-+-+-+-+-+-+-+-+-+-+-+-+-+-+-+-+-+-+-+-+-+-+-+-+-+-
```

F: 1 bit, is 0.

P: 1 bit, is 0.

SBIT: 3 Bits

Number of most significant bits that can be ignored in the first data octet.

EBIT: 3 Bits

End bit position specifies number of least significant bits that shall be ignored in the last data byte.

SRC: 3 Bits

Source format, bit 6,7 and 8 in PTYPE defined by H.263, specifies the resolution of the current picture.

I: 1 Bit.

Picture coding type, bit 9 in PTYPE defined by H.263, "0" is intra-coded, "1" is inter-coded.

H.263 Mode B Header Format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|P|SBIT|EBIT|SRC | QUANT| GOBN |      MBA        |R1 |
+-+-+-+-+-+-+-+-+-+-+-+-+-+-+-+-+-+-+-+-+-+-+-+-+-+-+-+-+-+-+-+-+
|I| R2  | HMV1      | VMV1      |        R3                     |
+-+-+-+-+-+-+-+-+-+-+-+-+-+-+-+-+-+-+-+-+-+-+-+-+-+-+-+-+-+-+-+-+
```

F: 1 bit, equals 1 to signal Mode B packet.

The following fields are defined the same as in H.263 Mode A header format: P, R, EBIT, SRC, I.

Start Bit Position (SBIT): 3 Bits

Number of most significant bits that should be ignored in the first data octet.

QUANT: 5 Bits

Quantization value for the first MB coded at the starting of the packet.

GOBN: 5 Bits

GOB number in effect at the start of the packet. GOB number is specified differently for different resolutions.

MBA: 9 Bits

The address within the GOB of the first MB in the packet, counting from zero in scan order. For example, the third MB in any GOB is given MBA=2.

HMV, VMV: 7 Bits Each.

Horizontal and vertical motion vector predictors for the first MB in this packet. Each 7 bits field encodes a motion vector predictor in half pixel resolution as a 2's complement number.

H.264:

Two packetization schemes are supported. In the first scheme, a single NAL unit is transported in a single packet. In this case, there is no payload header. In the second scheme, a NAL unit is fragmented into several packets. The video payload header is defined as following:

```
 0                   1
 0 1 2 3 4 5 6 7 8 9 0 1 2 3 4 5
+-+-+-+-+- +-+-+-+-+- +-+-+-+-+- +-+
|F|NRI| Type1  |S|E|R| Type2    |
+-+-+-+-+- +-+-+-+-+- +-+-+-+-+- +-+
```

F: 1 Bit=0.

NRI: 2 Bits

Nal_ref_idc.

Type1: 5 Bits×0x1C (Decimal 28)

S: 1 Bit

The Start bit, when one, indicates the start of a fragmented NAL unit. Otherwise, when the following FU payload is not the start of a fragmented NAL unit payload, the Start bit is set to zero.

E: 1 Bit

The End bit, when one, indicates the end of a fragmented NAL unit, i.e., the last byte of the payload is also the last byte of the fragmented NAL unit. Otherwise, when the following FU payload is not the last fragment of a fragmented NAL unit, the End bit is set to zero.

R: 1 Bit=0.

Type2: 5 Bits nal_unit_type as specified in H.264.

Figure 5:
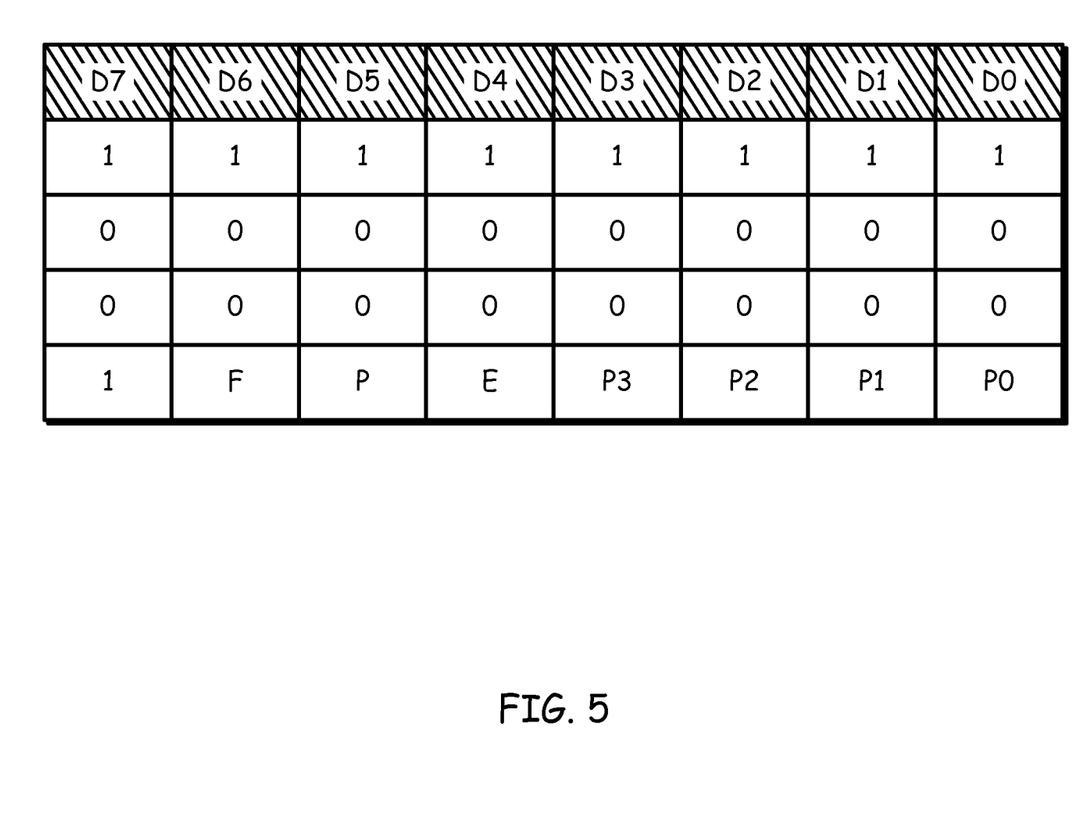
FIG. 5 is a block diagram describing the encoding of decompressed video data in accordance with an embodiment of the present invention.

Referring now to FIG. 5, there is illustrated a block diagram describing an exemplary header added by the output processor 330. Each video line can be transferred with a start code, pixel data and end code. Before the start code, a video parameter packet (VPP) 500 can be transferred to carry side information. The definition of the last row of the video parameter packet is as follows:

| Field | Description |
|---|---|
| F | 0 = top field, 1 = bottom field |
| P | 0 = pixel data, 1 = VPP |
| E | 0 = Start Code, 1 = End Code |
| P3 | P XOR E |
| P2 | F XOR E |
| P1 | P XOR F |
| P0 | P XOR F XOR E |

The VPP has the following format:

| Field | Length (bytes) | Definition |
|---|---|---|
| Stream Id | 1 byte | The stream id of the picture |
| Packet Length | 1 byte | Number of bytes of the VPP excluding the start code and encode code but count the stream Id |
| Picture Format | 1 byte | Bit 3: 0 for progressive, 1 for interlaced<br>Bit 2: 1 for Repeat__First__Field<br>Bit 1: 1 for Top__Field__First<br>Bit 0: 0 for normal, 1 for damaged picture<br>Bits 4-7: Reserved |
| X Size | 1 byte | Luminance X Size/16 |
| Y Size | 1 byte | Luminance Y Size/16 |
| Time Stamp | 4 bytes | Context dependent. For video decoding, this is the time stamp originally associated with the compressed picture |

Bit 0 of the Picture Format byte is meant for use for a decoder. When set to 1, it implied that part of the picture is damaged due to transmission/storage error or decoder internal error. The treatment for such pictures is dependent on the external device.

Figure 6:
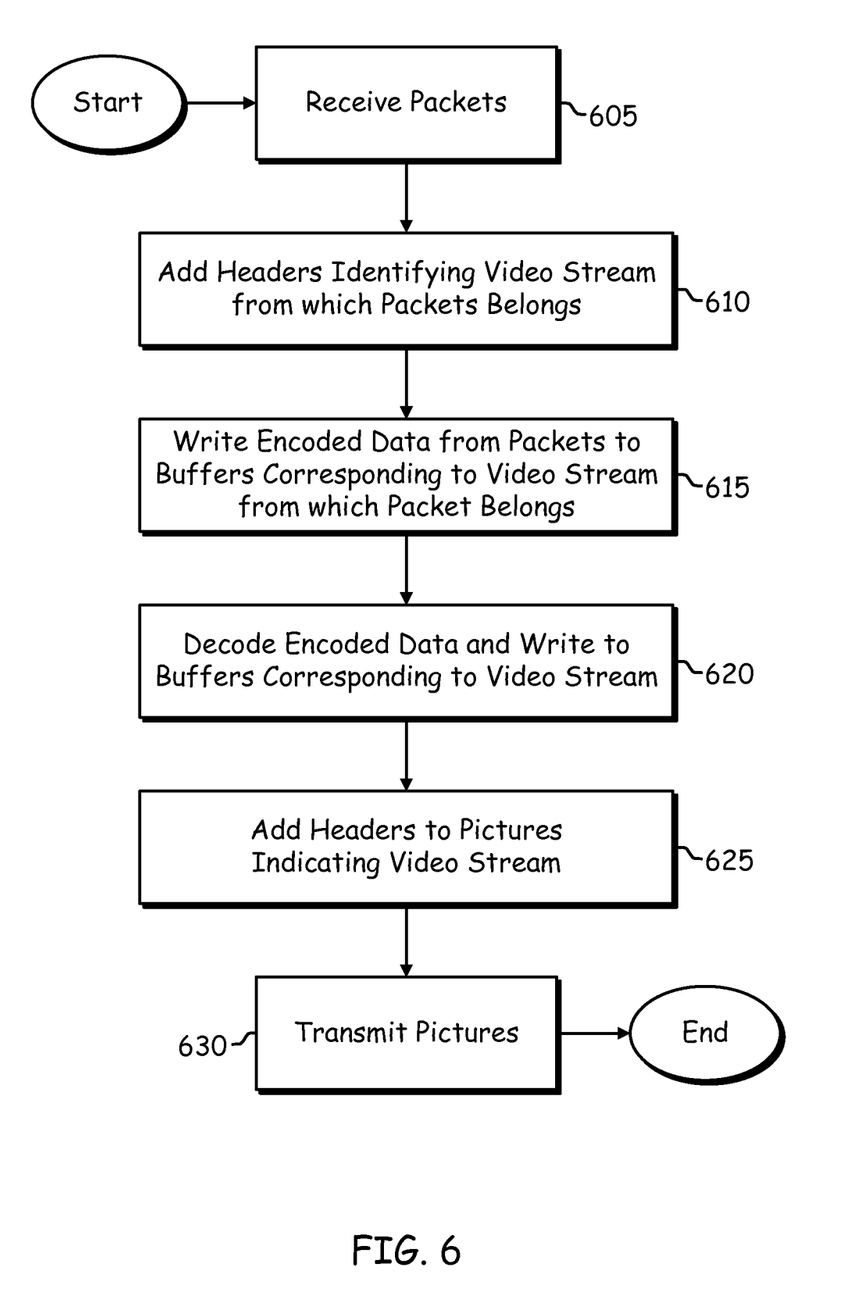
FIG. 6 is a flow diagram describing the operation of the multistream video decoder in accordance with an embodiment of the present invention.

Referring now to FIG. 6, there is a flow diagram for decoding multiple video streams in accordance with an embodiment of the present invention. At 605, the port 302 receives transport packet 205 carrying encoded video data 107'. At 610, the transport processor 305 adds a header to the encoded video data 107' carried in the transport packet 205. The header identifies the video stream 107 from which the encoded video data 107' came.

At 615, the packet demultiplexer 310 writes the encoded video data 107' from the packets to particular ones of the first plurality of buffers 315. The packet demultiplexer 310 writes the packets to the particular buffer 315 that corresponds to the video stream 107 identified in the packet header added to the packet during 610. At 620, the video decoder 320 decodes the encoded video data and writes the decoded video data to the particular one of the plurality of buffers 325 to which the decoded video data is from. At 625, the output processor 330 adds headers to decoded pictures indicating the video stream 107 to which the picture is from. At 630, the video output port 335 transmits the pictures to the video conferencing processor 125.

Figure 7:
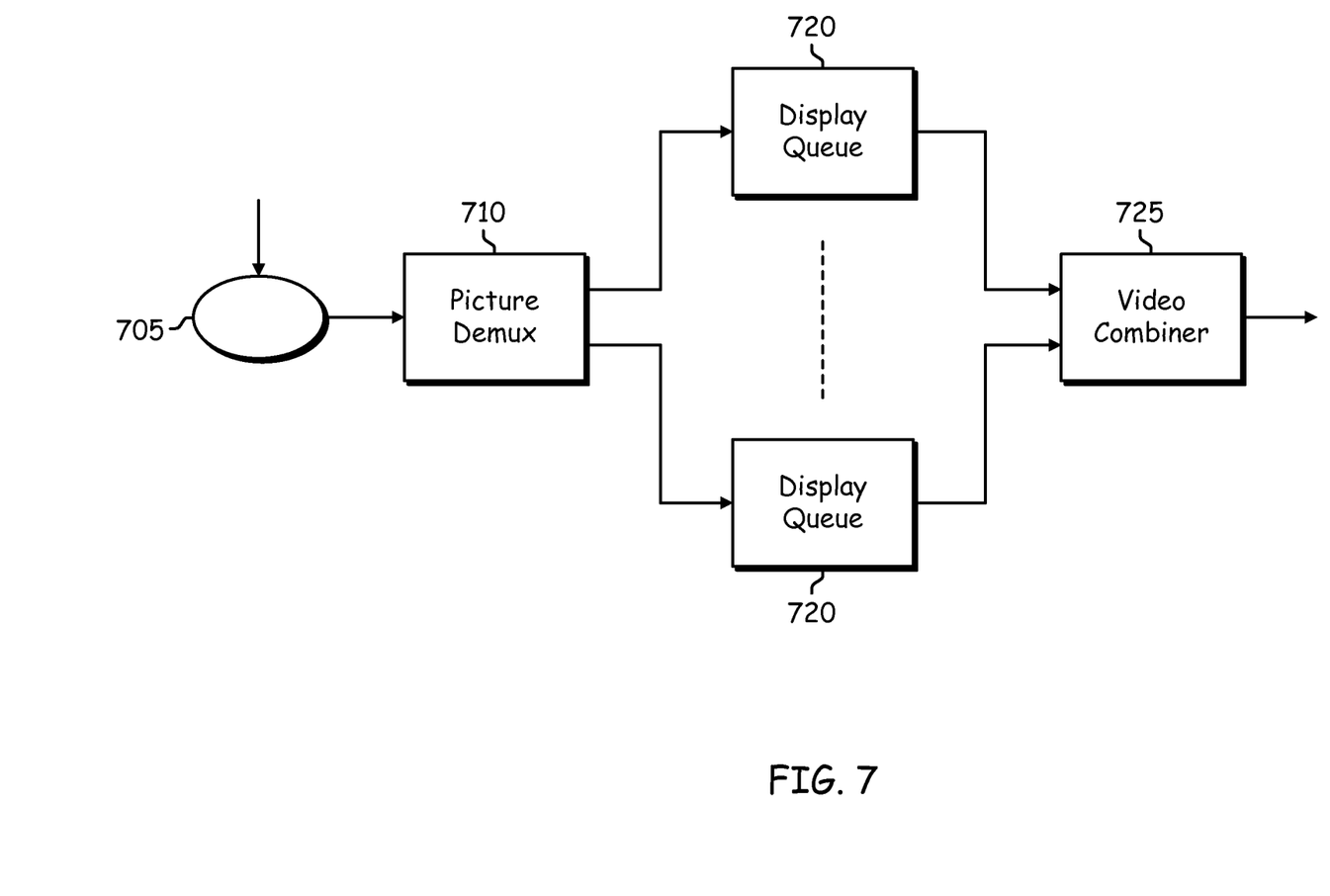
FIG. 7 is a block diagram of an exemplary video conferencing processor in accordance with an embodiment of the present invention.

Referring now to FIG. 7, there is illustrated a block diagram of the video conferencing processor 125. The video conferencing processor 125 comprises an input port 705, a picture demultiplexer 710, a plurality of display queues 720, and a video combiner 725.

The input port 705 receives the pictures from the video output port 335. The picture demultiplexer 710 examines the field stream_id in the header added to the picture by the output processor 330 to determine which video stream 107 that the picture belongs to. Each of the display queues 720 corresponds to a particular one of the video streams 107. The picture demultiplexer 710 writes the pictures to the display queue 720 corresponding to the video stream indicated by the field stream_id. The video combiner 725 combines the pictures from the display queues 720 for display on a single display.

Figure 8:
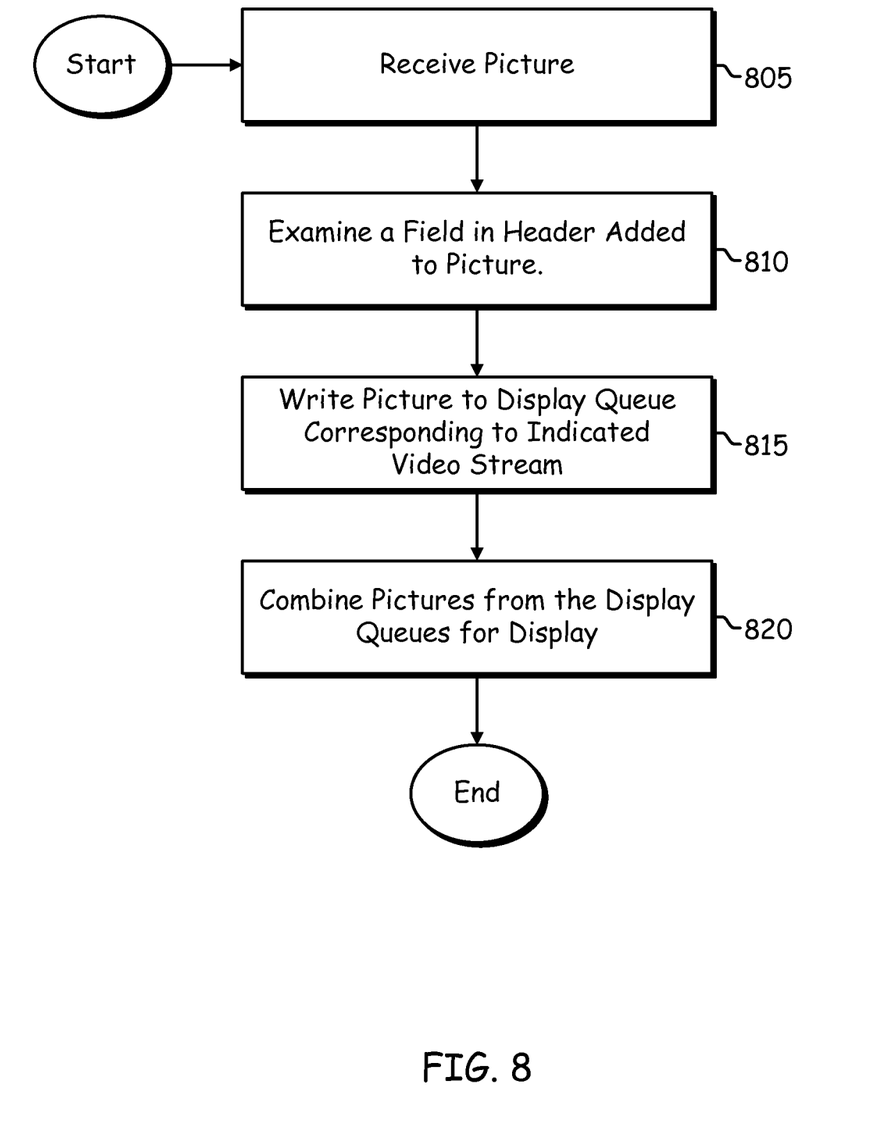
FIG. 8 is a flow diagram for display multiple video streams in accordance with an embodiment of the present invention.

Referring now to FIG. 8, there is illustrated a flow diagram for displaying multiple video streams. At 805, the input port 705 receives the pictures from the video output port 335. At 810, the picture demultiplexer 710 examines the field stream_id in the header added to the picture by the output processor 330 to determine to which video stream 107 the picture belongs. The picture demultiplexer 710 writes (815) the pictures to the display queue 720 corresponding to the video stream indicated by the field stream_id. The video combiner 725 combines (820) the pictures from the display queues 720 for display on a single display.

The embodiments described herein may be implemented as a board level product, as a single chip, application specific integrated circuit (ASIC), or with varying levels of the decoder system, video conference processor, or video combiner integrated with other portions of the system as separate components. The degree of integration will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware. In one embodiment, a deinterlacer can be incorporated into a single integrated circuit.

Although the embodiments described herein are described with a degree of particularity, it should be noted that changes, substitutions, and modifications can be made with respected to the embodiments without departing from the spirit and scope of the present application. Accordingly, the present application is only limited by the following claims and equivalents thereof.

What is claimed is:

1. A video conference system for providing a plurality of video streams, comprising:
   a plurality of display queues corresponding to the plurality of video streams;
   a picture demultiplexer configured to determine a particular video stream for a decoded picture, wherein the decoded picture is from the particular video stream, and write the decoded picture to a particular one of the display queues corresponding to the particular video stream; and
   a video combiner configured to combine decoded pictures from the display queues together for a single display.

2. The video conference system of claim 1, wherein the picture demultiplexer is further configured to determine the particular video stream for the decoded picture by examining an indicator associated with the decoded picture.

3. A video conference method, comprising:
   receiving decoded pictures corresponding to a plurality of video streams;

determining which video stream a received decoded picture among the received decoded pictures belongs from the plurality of video streams; and writing the received decoded picture to a particular one of a plurality of display queues corresponding to the determined video stream to which the received decoded picture belongs.

4. The method of claim 3, wherein the particular video stream to which the received decoded picture belongs is determined by examining an indicator associated with the received decoded picture.

5. The method of claim 3, further comprising combining the decoded pictures from the display queues together for a single display.

6. The method of claim 3, further comprising decoding encoded video data from transport packets received from the plurality of video streams.

7. The method of claim 6, wherein the decoding comprises decompressing the encoded video data.

8. The method of claim 7, wherein the encoded video data is compressed in accordance with a video compression standard comprising one of H.261, H.262, H.263, or H.264 standard.

9. The method of claim 3, wherein a single video decoder decodes each of the plurality of video streams.

10. A method for decoding video data, comprising:
receiving transport packets carrying encoded video data from a plurality of video streams;
determining from a transport header of one of the transport packets which particular video stream of the plurality of video streams to which the transport packet belongs; and
writing the encoded video data to a particular one of a plurality of buffers corresponding to the particular video stream to which the transport packet belongs.

11. The method of claim 10, further comprising changing an indicator to the encoded video data from the one of the transport packets, the indicator identifying the particular video stream, wherein the transport packet is from the particular video stream.

12. The method of claim 10, further comprising:
decoding the encoding video data in the particular one of the plurality of buffers; and
writing the decoded video data to a particular one of a plurality of second buffers corresponding to the particular video stream to which the transport packet belongs.

13. The method of claim 12, wherein the encoded video data is compressed in accordance with a video compression standard comprising one of H.261, H.262, H.263, or H.264 standard.

14. The method of claim 12, further comprising changing a second indicator to the decoded video data from the particular one of the plurality of second buffers, the second indicator identifying the particular video stream to which the transport packet belongs.

15. The method of claim 14, further comprising transmitting the decoded video data with the second indicator from the plurality of second buffers to a video conferencing processor.

16. The method of claim 15, wherein an output processor changes the second indicator to the decoded video data and transmits the decoded video data with the second indicator to the video conferencing processor.

17. The method of claim 14, further comprising:
receiving the transmitted video data from the plurality of second buffers corresponding to the plurality of video streams;
determining which video stream a decoded picture from the received video data belongs; and
writing the received decoded picture to one of a plurality of display queues corresponding to the determined video stream to which the received decoded picture belongs.

18. The method of claim 17, wherein the video stream to which the received decoded picture belongs is determined by examining the second indicator associated with the received decoded picture.

19. The method of claim 17, further comprising combining pictures from the display queues together for a single display.

20. The method of claim 12, wherein a single video decoder decodes encoded video data for each of the plurality of video streams.

* * * * *